UNITED STATES PATENT OFFICE.

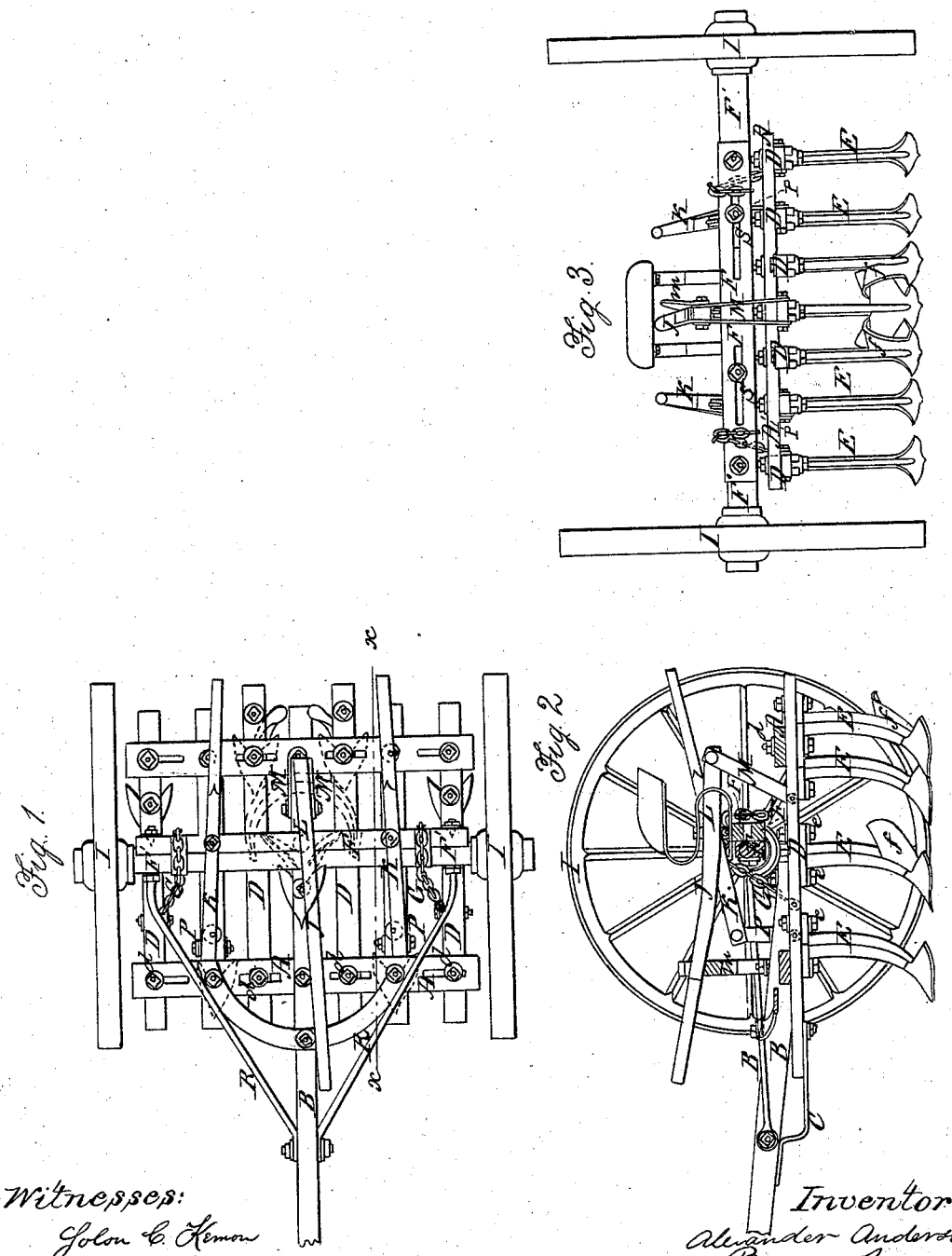

ALEXANDER ANDERSON, OF LONDON, CANADA WEST.

IMPROVEMENT IN CULTIVATORS.

Specification forming part of Letters Patent No. 58,188, dated September 18, 1866.

*To all whom it may concern:*

Be it known that I, ALEXANDER ANDERSON, of London, in the county of Middlesex and Province of Canada West, have invented a new Improvement in Cultivators; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a top or plan view. Fig. 2 is a longitudinal vertical section on the lines $x\ x$, Fig. 1. Fig. 3 is a rear elevation.

The improvement consists in the mode of suspending the frame containing the cultivator-shares, and to which the tongue is attached so that it shall have free motion and adjustability, to suit the varying surface of the ground, and to avoid or disengage from obstructions in its path.

It also consists in the construction of the extension axle-tree, by means of which either or both of the wheels are set out or in relatively to the cultivator-frame, so as to increase the distance between the outer share and the wheel, to enable the wheel to run in a furrow, to act as a gage in laying off rows, or avoid running upon a certain row when cultivating a crop.

In the drawings, A D is the frame of the cultivator, and B the tongue, the latter being braced by the strap C. The longitudinal bars D are adjustable laterally by means of bolts $d$ in the slots of the frame A, so as to gage the width apart of the shares.

The shares E are attached to the bars D by means of bolts $e$, and can be removed to meet special requirements—as, for instance, the middle one, when tending the ground on each side of a row of corn or potatoes.

The wings $f$ on the shares may be removable, so as to throw up the soil into a ridge in covering potatoes or against a row of plants.

The frame of the cultivator is suspended from the axle F by means of two chains, G G, whose length is adjustable by means of the catch-plates H H, the upturned edges of which have slits, which catch the links of the chain, and enable the frame of the cultivator to be suspended at such distance below the axle as may suit the depth of tillage required.

The axle F, supported upon the wheels I, is made the means of support of the cultivator-frame, and also the fulcrum for levers J K K, by which it is raised bodily or tilted to avoid or free it from obstacles.

The lever J has its fulcrum at L on the axle, the link M connecting one end with the cultivator, while the other or forward end, by which it is manipulated, has a catch-post, $m$, which detains it when, by its depression, the cultivator is lifted from the ground.

The seat O is for the driver, within whose reach the levers J K K are all arranged; but if it be desired to walk behind the machine instead of riding on it, the lever may be reversed end for end, the link M being attached to the frame forward of the axle, and the catch-post $m$ placed in the rear of the axle.

The levers K K are likewise pivoted upon the axle, and connected by links P P to the frame of the cultivator, and, as has been said, are used for lifting one side, to enable it to pass an obstacle.

It will be observed the fulcrum-points of these levers, as well as their attachments to the frame, have such a freedom of motion as not to confine the cultivator rigidly; but, being swivel-joints, it has all the requisite freedom for assuming a position adapted to the inclination or inequalities of the surface, to which it may be further adapted, if need be, by variation in the respective lengths of the chains G G.

The tongue B is attached to the axle F by means of the stay-rods R R, the points of attachment of the latter admitting of freedom of vertical motion of cultivator under any of the controlling devices before mentioned.

The axle consists of three pieces—one central one, F, to which the levers are pivoted, and two end pieces, F' F', to whose ends the spindles for the wheels are attached. Slots in each of the pieces of the axle enable the end pieces, F' F', in connection with the bolts S S, to be adjusted outwardly or inwardly, so as to bring the wheels to track at the required distance from each other.

Having described my invention, what I claim therein as new, and desire to secure by Letters Patent, is—

1. The mode of suspending the cultivator-frame beneath the axle by means of the chains G G, rods R R, and levers J K K, so arranged, as described, to give it the necessary lateral and vertical play.

2. The slotted extension-axles F' F', counterpart central portion, F, and bolts S S, constructed and operating as described and represented.

ALEX. ANDERSON.

Witnesses:
EDWARD H. KNIGHT,
JAMES L. EWIN.